US009500035B2

(12) United States Patent
Ren et al.

(10) Patent No.: US 9,500,035 B2
(45) Date of Patent: Nov. 22, 2016

(54) INTEGRATED MANAGED PRESSURE DRILLING TRANSIENT HYDRAULIC MODEL SIMULATOR ARCHITECTURE

(71) Applicant: Chevron U.S.A. Inc., San Ramon, CA (US)

(72) Inventors: Henry H. Ren, Sugar Land, TX (US); Amitkumar C. Jain, Houston, TX (US); John B. Trenery, Sugar Land, TX (US); Dale G. Straub, Houston, TX (US); Pete A. James, Benicia, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 149 days.

(21) Appl. No.: 14/507,244

(22) Filed: Oct. 6, 2014

(65) Prior Publication Data

US 2016/0097240 A1 Apr. 7, 2016

(51) Int. Cl.
*E21B 7/12* (2006.01)
*E21B 21/08* (2006.01)
(Continued)

(52) U.S. Cl.
CPC .............. *E21B 7/12* (2013.01); *E21B 21/001* (2013.01); *E21B 21/08* (2013.01); *E21B 33/035* (2013.01); *E21B 44/00* (2013.01); *E21B 47/00* (2013.01); *E21B 47/12* (2013.01); *H04L 67/10* (2013.01)

(58) Field of Classification Search
CPC ........ E21B 7/12; E21B 21/001; E21B 21/08; E21B 33/035; E21B 44/00; E21B 47/0001; E21B 47/12
See application file for complete search history.

(56) References Cited

U.S. PATENT DOCUMENTS 6,505,691 B2 * 1/2003 Judge .................... E21B 21/001
137/565.16
6,571,873 B2 6/2003 Maus
(Continued)

FOREIGN PATENT DOCUMENTS

WO 2012003101 1/2012
WO 2012027245 3/2012
(Continued)

OTHER PUBLICATIONS

IADC/SPE 112687: "Automatic Measurement of Drilling Fluid and Drill Cuttings Properties" by Saasen, A; Omland, T H; Ekrene, S; Breviere, J; Villard, E; Kaageson-Loe, N; Tehrani, A; Cameron, J; Freeman, M; Growcock, F; Patrick, A; Stock, T; Jorgensen, T; Reinholt, F; Scholz, N; Amundsen, H.E. F; Steele, A, Meeten, G. 2008 Drilling Conference.

(Continued)

*Primary Examiner* — Matthew R Buck
(74) *Attorney, Agent, or Firm* — Karen R. DiDomenicis; King & Spalding LLP

(57) ABSTRACT

A system is described herein for performing off shore field operations. The system includes a number of process measuring devices that measure real-time process data. The system can further include a wellhead stack positioned at a sea floor, where the wellhead stack performs managed pressure drilling (MPD) as part of the field operations. The system can also include a dynamic process module executing on a hardware processor and providing first real-time output during the MPD using the real-time process data, where the dynamic process module includes a first off-the-shelf software package communicably coupled to a first model. The system can further include a dynamic integration engine executing on a hardware processor and receiving a first real-time output from the first model of the dynamic process module.

20 Claims, 4 Drawing Sheets

(51) Int. Cl.
*E21B 44/00* (2006.01)
*E21B 47/001* (2012.01)
*H04L 29/08* (2006.01)
*E21B 33/035* (2006.01)
*E21B 47/00* (2012.01)
*E21B 21/00* (2006.01)
*E21B 47/12* (2012.01)

(56) References Cited

U.S. PATENT DOCUMENTS

| | | | |
|---|---|---|---|
| 6,854,532 B2 | 2/2005 | Fincher et al. | |
| 6,904,981 B2* | 6/2005 | van Riet | E21B 21/08 166/265 |
| 7,174,975 B2* | 2/2007 | Krueger | B63B 21/502 175/107 |
| 7,185,719 B2 | 3/2007 | van Riet | |
| 7,270,185 B2* | 9/2007 | Fontana | E21B 7/12 166/347 |
| 7,367,411 B2* | 5/2008 | Leuchtenberg | E21B 21/08 166/53 |
| 7,395,878 B2* | 7/2008 | Reitsma | E21B 21/08 175/38 |
| 7,650,950 B2* | 1/2010 | Leuchtenberg | E21B 21/08 166/53 |
| 7,721,822 B2* | 5/2010 | Krueger | E21B 21/08 175/25 |
| 7,836,973 B2 | 11/2010 | Belcher et al. | |
| 8,122,975 B2 | 2/2012 | Belcher et al. | |
| 8,281,875 B2* | 10/2012 | Lovorn | E21B 21/10 175/25 |
| 9,080,407 B2* | 7/2015 | Bernard | E21B 21/08 |
| 9,279,299 B2* | 3/2016 | Lovorn | E21B 21/08 |
| 2003/0196804 A1 | 10/2003 | Riet | |
| 2004/0144565 A1 | 7/2004 | Koederitz | |
| 2005/0092523 A1 | 5/2005 | McCaskill et al. | |
| 2007/0227774 A1* | 10/2007 | Reitsma | E21B 21/08 175/25 |
| 2011/0139506 A1 | 6/2011 | Lovorn et al. | |
| 2011/0153296 A1* | 6/2011 | Sadlier | E21B 44/00 703/7 |
| 2011/0297388 A1 | 12/2011 | Stave | |
| 2013/0206423 A1* | 8/2013 | Weinstock | E21B 7/12 166/358 |
| 2015/0053483 A1* | 2/2015 | Mebane, III | E21B 44/00 175/26 |

FOREIGN PATENT DOCUMENTS

| | | |
|---|---|---|
| WO | 2013152072 | 10/2013 |
| WO | 2013164478 | 11/2013 |

OTHER PUBLICATIONS

SPE 107547 "Improved Drilling Process Control Through Continuous Particle and Cuttings Monitoring" by Omland, T H; Saasen, A; Taugbol, K; Dahl, B; Jorgensen, T ., Reinholdt, F; Scholz, N; Ekrene, S; Villard, E; Amundsen, P.A.; Amundsen, H.E. F.; Fries, M and Steele, A. 2007 Digital Energy Conference and Exhibition in Houston, TX Apr. 11-12, 2007.

49th Annual SPWLA Logging Symposium (Edinburgh, Scotland, May 25-29, 2008) "Method of Determining Formation Grain Size Distribution from Acoustic Velocities and NMR Relaxation Time Spectrum" by Gladkikh, M; Chen, J; Chen, S; Inteq.

SPE 151459 "Real-Time Drilling Fluid Monitoring and Analysis—Adding to Interated Drilling Operations" by Egil Ronaes, Truls Fossdal and Tore Stock of M-1 Swaco 2012 IADC/SPE Drilling ??Conference in San Diego, CA Mar. 6-8, 2012.

* cited by examiner

INTEGRATED MANAGED PRESSURE DRILLING TRANSIENT HYDRAULIC MODEL SIMULATOR ARCHITECTURE

TECHNICAL FIELD

The present disclosure relates generally to subterranean field operations, and more particularly to systems, methods, and devices for subterranean field operations using sea floor mud lift drilling.

BACKGROUND

Deepwater managed pressure drilling (MPD) can include a number of different types of field operations, including but not limited to sea floor mud lift drilling (SMD) (also called other names, such as subsea mudlift drilling). SMD can exist in at least two different configurations, including but not limited to single gradient drilling (SGD) and dual gradient drilling (DGD). In the DGD variation, SMD is used in deep water field operations where the drilling mud is pumped from the sea floor to the drilling vessel to create the effect of dual pressure gradients in the returning mud column. When SMD is used with a conventional marine riser, the riser is filled with seawater, and the mud is pumped up return lines. When used with independent return lines, the SMD system permits "riserless" drilling, which refers to lack of a conventional marine riser. Smaller return lines require much less tension, may be faster to deploy, and contain much less mud volume.

SUMMARY

In general, in one aspect, the disclosure relates to system for performing off shore field operations. The system can include a number of process measuring devices that measure real-time process data. The system can also include a wellhead stack positioned at a sea floor, where the wellhead stack performs managed pressure drilling (MPD) as part of the field operations. The system can further include a dynamic process module executing on a first hardware processor and providing first real-time output during the MPD using the real-time process data, where the dynamic process module includes a first off-the-shelf software package communicably coupled to a first model. The system can also include a dynamic integration engine executing on a second hardware processor and receiving a first real-time output from the first model of the dynamic process module.

In another aspect, the disclosure can generally relate to a method for integrating real-time data associated with an off shore field operation. The method can include receiving, from a dynamic process module, a first real-time output, where the first real-time output is based on real-time process data measured by a number of process measuring devices, where the real-time process data is measured during a dual gradient drilling operation, where the off shore field operation includes the dual gradient drilling operation. The method can also include sending, on a real-time basis, the first real-time output of the dynamic process module to a drilling module, where the first real-time output is sent during the dual gradient drilling operation. The drilling module generates a report of the dual gradient drilling operation using the first real-time output of the dynamic process module.

These and other aspects, objects, features, and embodiments will be apparent from the following description and the appended claims.

BRIEF DESCRIPTION OF THE DRAWINGS

The drawings illustrate only example embodiments of integrated MPD transient hydraulic model simulator (THMS) architecture and are therefore not to be considered limiting of its scope, as the disclosure may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION

Figure 1:
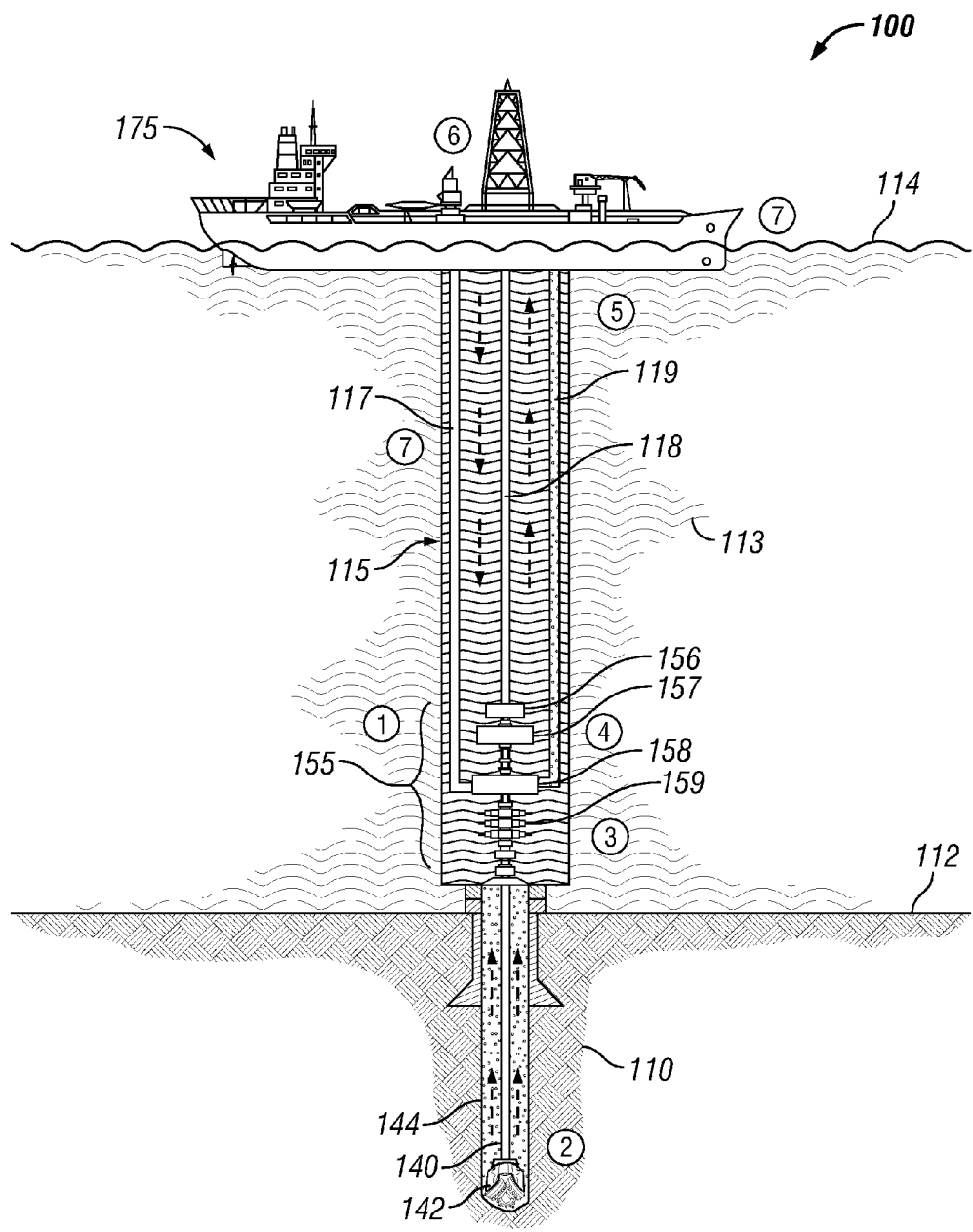
FIG. 1 shows a system view of an offshore field operation in accordance with one or more example embodiments.

The example embodiments discussed herein are directed to systems, apparatuses, computer readable mediums, and methods of integrated MPD THMS architecture. While the example integrated MPD THMS architecture shown in the Figures and described herein are directed to fields using a subsea mud lift pump in deep water environments, example integrated MPD THMS architecture can also be used in fields that do not use subsea mud lift pumps, and/or that are located in relatively shallow offshore and/or land-based environments. Thus, the examples of integrated MPD THMS architecture described herein are not limited to use with fields using a subsea mud lift pump in deep water environments. As defined herein a deep water environment is where the depth between the water level and the sea floor is at least 500 feet.

Example embodiments discussed herein are with reference to performing a field operation. A field may be any formation (e.g., rock, sand, ice). The field operation is performed to reach and/or extract a subterranean material and/or formation in certain example embodiments. Such a material includes, but is not limited to, a hydrocarbon (e.g., oil, natural gas), coal, a metal, hydrogen, and water. A field operation is also related to finding a subterranean formation that is used for storage, as for natural gas or carbon dioxide, according to certain example embodiments. As defined herein, the term "real-time" shall mean at the same time or at substantially the same time, so that there is no appreciable delay between relevant actions (e.g., measuring data, receiving data, sending data).

In addition to real-time use in actual field operations, example embodiments can be used in one or more of a number of other situations related field operations, such as off shore field operations. For example embodiments can be used for planning purposes, predictive purposes, real-time analysis, offline analysis, performing simulations, identification of discrepancies between actual and expected data, and training of personnel. Any communication protocol described herein can be the same as, or different than, one or more of the other communication protocols used in example embodiments. Further, any communication protocol can be configured to send and receive data (bi-directional), only send data (unidirectional), or only receive data (unidirectional) between components in an example system.

The MPD process can be used to mitigate downhole pressure problems and reduce design costs in deepwater environments. In order to realize these benefits, example embodiments use rigorous modeling and simulation of transient hydraulics and pressure profiles for the entire mud circulating system. Currently, individual off-the-shelf software tools are used for specific areas of the mud circulating system. Unlike the current art, example embodiments provide an integrated solution that provides complete modeling and simulation of the entire mud circulating system, including the drilling operation and the process equipment operation.

As defined herein, an off-the-shelf software package is directed to a particular and specific aspect of a field operation. Examples of such off-the-shelf software packages can include, but are not limited to, DrillBench (DrillBench is a registered mark of SPT Group Norway, located in Kjeller, Norway), OLGA (OLGA is a registered mark of SPT Group Norway, located in Kjeller, Norway), and DrillScene (DrillScene is a registered mark of Drilltronics Rig System AS, located in Stavanger, Norway).

Example embodiments of integrated MPD THMS architecture will be described more fully hereinafter with reference to the accompanying drawings, in which example embodiments of integrated MPD THMS architecture are shown. Integrated MPD THMS architecture may, however, be embodied in many different forms and should not be construed as limited to the example embodiments set forth herein. Rather, these example embodiments are provided so that this disclosure will be thorough and complete, and will fully convey the scope of integrated MPD THMS architecture to those of ordinary skill in the art. Like, but not necessarily the same, elements (also sometimes called modules) in the various figures are denoted by like reference numerals for consistency.

Terms such as "first," "second," "end," "inner," "outer," "upper," "lower," "distal," and "proximal" are used merely to distinguish one component (or part of a component or state of a component) from another. Such terms are not meant to denote a preference or a particular orientation. Also, the names given to various components described herein are descriptive of one embodiment and are not meant to be limiting in any way. Those of ordinary skill in the art will appreciate that a feature and/or component shown and/or described in one embodiment (e.g., in a figure) herein can be used in another embodiment (e.g., in any other figure) herein, even if not expressly shown and/or described in such other embodiment.

FIG. 1 shows a schematic diagram of a deep water offshore field system 100 in which integrated MPD THMS architecture can be used in accordance with certain example embodiments. In one or more embodiments, one or more of the features shown in FIG. 1 may be omitted, added, repeated, and/or substituted. Accordingly, embodiments of a field system should not be considered limited to the specific arrangements of components shown in FIG. 1.

The field system 100 of FIG. 1 can use a semi-submersible platform 175 (in some cases, a drilling ship) because of the depth of the water 113. For example, the depth of the water 113 in FIG. 1 (i.e., the distance between the water level 114 and the sea floor 112) can be more than five hundred feet (e.g., five thousand feet). Below the sea floor 112, a bottom hole assembly 142, which includes a drill bit, is used to drill and extend a wellbore 144 in the subterranean formation 110. The point where the wellbore 144 begins at the sea floor 112 can be called the entry point. The subterranean formation 110 can include one or more of a number of formation types, including but not limited to shale, limestone, sandstone, clay, sand, and salt. In certain embodiments, a subterranean formation 110 can also include one or more reservoirs in which one or more resources (e.g., oil, gas, water, steam) can be located. One or more of a number of field operations (e.g., drilling, setting casing, extracting downhole resources) can be performed to reach an objective of a user with respect to the subterranean formation 110.

The wellbore 144 can have one or more of a number of segments, where each segment can have one or more of a number of dimensions. Examples of such dimensions can include, but are not limited to, size (e.g., diameter) of the wellbore 144, a curvature of the wellbore 144, a total vertical depth of the wellbore 144, a measured depth of the wellbore 144, and a horizontal displacement of the wellbore 144. Field equipment can be used to create and/or develop (e.g., extract downhole materials) the wellbore 144. The field equipment can be positioned and/or assembled on the platform 175. The field equipment can include, but is not limited to, a derrick, a tool pusher, a clamp, a tong, drill pipe, the drill bit, tubing pipe, a power source, and casing pipe. The field equipment can also include one or more devices that measure and/or control various aspects (e.g., direction of wellbore 144, pressure, temperature) of a field operation associated with the wellbore 144. For example, the field equipment can include a measurement-while-drilling (MWD) tool that is part of the bottom hole assembly 142 and provides real-time and detailed information (e.g., curvature, azimuth, inclination) during a field operation (e.g., drilling) within the wellbore 144. Generally, these measuring devices can be drilling operation measuring devices 260 and process measuring devices 262, all as described below with respect to FIG. 2A.

Above the sea floor 112 in FIG. 1, the field system 100 can include a piping system 115 that includes a riser 118 and at least one mud return line (in this case, mud return line 117 and mud return line 119) disposed in the water 113. Each mud return line can be connected to a mud processing unit, where the mud can be analyzed and/or processed for recirculation into the drilling process. Some or all of the piping system can be encased in a protective sheath. The riser 118 can have a cavity along its length into which the tubing string 140 can be disposed. Between the tubing string 140 in the wellbore 144 and the tubing string 140 within the riser 118 can be a wellhead stack 155 located at or near the mudline 202. The wellhead stack 155 can include one or more of a number of components. For example, as shown in FIG. 1, the wellhead stack 155 can include a subsea rotating device 156, a solids processing unit 157, a mud lift pump 158 (also called MLP 158), and a blow-out preventer 159. Each of the mud return lines (in this case, mud return line 117 and mud return line 119) can be coupled to the MLP 158. In other words, the MLP 158 circulates mud through at least one separate mud return line. The MLP 158 helps to control the dynamic annular pressure at any point or at multiple points in the wellbore 144.

In certain example embodiments, the MLP 158 is a very large, expensive, and complex device. For example, the MLP 158 can be over 30 feet tall, weigh over 30 tons, and include multiple chambers and chokes. This operational complexity adds to the impropriety of using estimated data rather than actual data during a field operation. An example of a MLP 158 is described in U.S. Pat. No. 6,325,159, entitled "Offshore Drilling System", the entire contents of which are incorporated herein by reference. Example embodiments are important for field operations involving a MLP 158 because pressure flow solvers and calculators can be integrated into a unified solution for a field operation.

The MLP 158 can be used to promote SMD, DGD, or some other form of MPD. For example, in DGD, multiple (e.g., two) weights of drilling mud are used, as opposed to a single weight of drilling mud used in conventional field operations. As an example, a drilling mud having one weight can be used above the sea floor 112, and a drilling mud having a different weight can be used in the wellbore 144 below the sea floor 112. In DGD, the MLP 158 can be used in the return line. In such a case, the mud still flows down inside the tubing string 140, but the MLP 158, powered by sea water, circulates mud and cuttings back to the platform 175 through a mud return line (e.g., mud return line 117, mud return line 119) located outside the riser 118, as shown in FIG. 1. The annulus of the riser 118 (between the riser 118 and the outside of the tubing string 140) is filled with seawater, so that the pressure in the annulus of the riser 118 is substantially similar to the pressure of the ocean water 113.

As a result, fluctuating pressures in the subterranean formation 110 (under the sea floor 112) during a field operation can become much easier to manage from an operational standpoint. Thus, seawater gradient is at issue between the water level 114 and the sea floor 112, and mud gradient is at issue below the sea floor 112. In terms of pressure, this situation is like operating a deep water field operation on the sea floor 112 (like land-based drilling), where risers aren't needed. Put another way, MPD allows a user to more closely match the pressures presented by nature and effectively eliminates water depth as a consideration in well design. By placing the MLP 158 on the sea floor 112, the pressure exerted on the shallow weak formations can be reduced but still remain high enough at the bottom of the wellbore 144 to control formation pressure. Thus, heavier mud can be used under the sea floor 112, and deeper holes can be drilled into the subterranean formation 110.

Because of the relative novelty of MPD operations, especially using a MLP 158, and because of the varying pressures used above and below the sea floor 112, the operations of each area is very different. Thus, there is no integrated modeling package that processes, on a real-time basis, a field operation using MPD. Further, discrete modeling currently used for process operations, transient operations (both above the sea floor 112), and drilling operations (below the sea floor 112) are not integrated, which can present significant challenges during a field operation. Example embodiments are used to integrate, on a real-time basis, discrete systems used for process operations, transient operations, and drilling operations so that a user can accurately assess and adjust a field operation in real-time. This can be especially important, for example, when pressures in the subterranean formation 110 during a drilling operation suddenly change. Otherwise, the safety and efficiency of a field operation using MPD with a MLP can be negatively impacted.

As a specific example, as shown in FIG. 1, various modules of modeling software can be used in a field operation. Each of these modules can include an off-the-shelf software package that is customized to a site by developing a model that acts as an interface between the off-the-shelf software package and one or more other modules (communicably coupled to the off-the-shelf software package) in the field system 100. In this case, a drilling module is used to model the field operation with respect to the activities under the sea floor 112, as denoted by the circled numbers 1 and 2 in FIG. 1. A process module (also called a dynamic process module) is used to model the field operation with respect to activities involving the circulation of sea water within the riser 118 above the sea floor 112, as denoted by the circled numbers 4 and 6-8 in FIG. 1. A transient hydraulic module is used to model the field operation with respect to activities involving the circulation of the mud above the sea floor 112, as denoted by the circled numbers 3 and 5 in FIG. 1. The drilling module, the dynamic process module, and the transient hydraulic module are described in more detail below with respect to FIG. 2A.

Figure 2A:
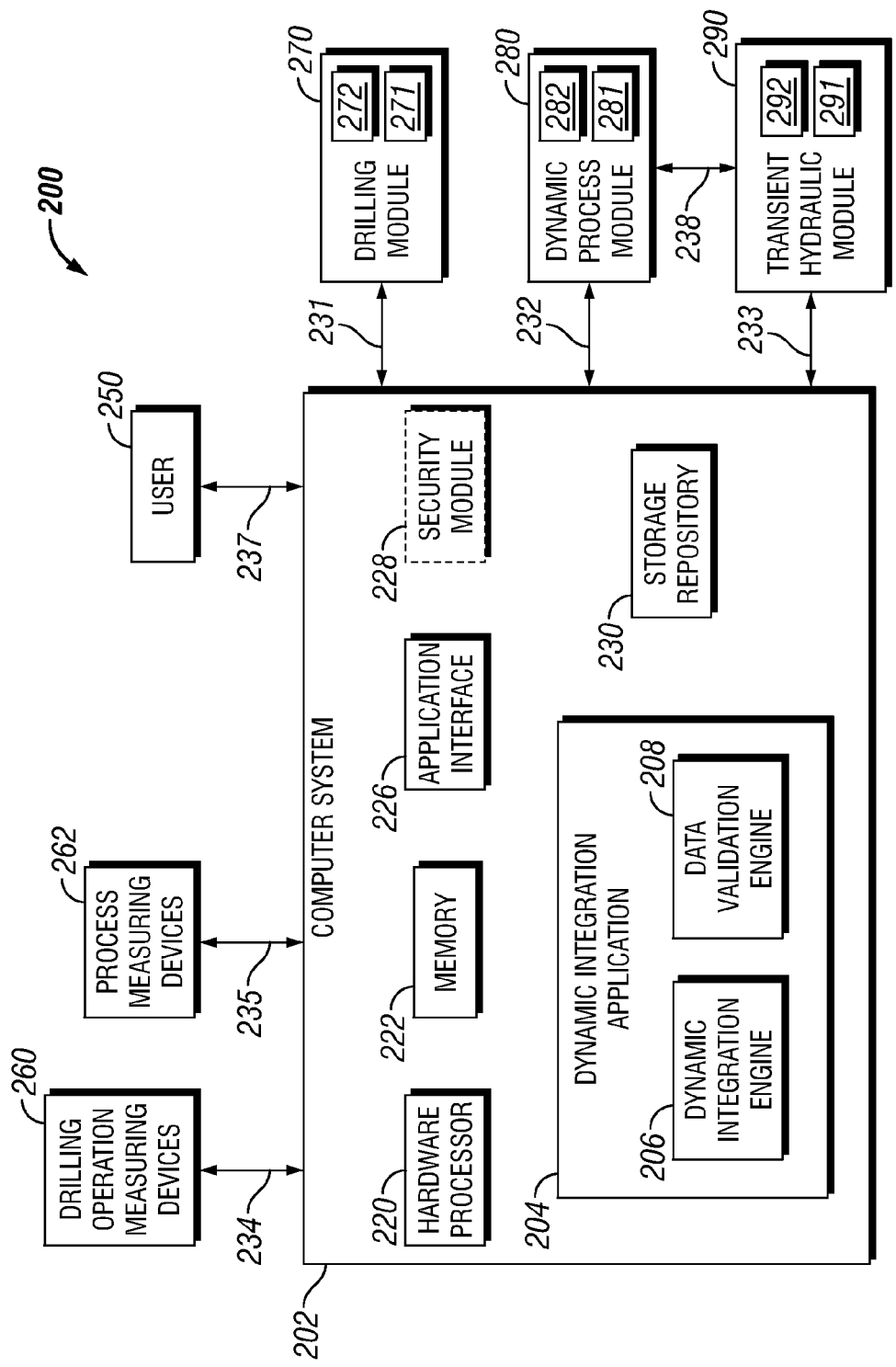
FIG. 2A shows a diagram of a system having MPD THMS architecture in accordance with one or more example embodiments.

FIG. 2A shows a diagram of a system 200 (the MPD THMS architecture) in accordance with one or more example embodiments. The system 200 includes a computer system 202, a number of measuring devices (e.g., drilling operation measuring devices 260, process measuring devices 262), a drilling module 270, a dynamic process module 280, a transient hydraulic module 290, and a user 250. The computer system 202 includes a dynamic integration application 204, a storage repository 230, a hardware processor 220, a memory 222, an application interface 226, and, optionally, a security module 228. The dynamic integration application 204 includes a dynamic integration engine 206. Each of these components is described in further detail below. Example embodiments are not limited to the configuration shown in FIG. 2A and discussed herein. Additionally, although certain components have been enumerated as being part of the system 200, it is understood that some components are combined with other components and/or some components are further divided into additional components in other alternative example embodiments.

In one or more example embodiments, the computer system 202 is implemented according to a client-server topology. The computer system 202 may correspond to enterprise software running on one or more servers, and in some embodiments may be implemented as a peer-to-peer system, or resident upon a single computing system. In addition, the computer system 202 may be accessible from other machines using one or more application programming interfaces and/or user interfaces (not shown). In one or more example embodiments, the computer system 202 may be accessible over a network connection (not shown), such as the Internet, by one or more users. Further, information and/or services provided by the computer system 202 may also be stored and accessed over the network connection.

Alternatively or additionally, in one or more example embodiments, the computer system 202 is a local computer system of the user 250 and/or of one or more measuring devices (e.g., drilling operation measuring devices 260, process measuring devices 262). In such embodiments, the computer system 202 is, optionally, not implemented using a client-server topology. For example, the computer system 202 corresponds to a laptop computer, desktop computer, mobile device, another type of computing device, or a combination of multiple computing devices. Additionally or alternatively, the computer system 202 is a distributed computer system and/or a multi-processor computer system in which the computer system includes multiple distinct computing devices.

Continuing with FIG. 2A, the user 250 uses one or more applications (not shown) to communicate with the computer system 202 in accordance with one or more example embodiments. For example, the user 250 receives a notification from the computer system 202 as to the status or a change in a field operation. According to some example embodiments, the user 250 is an engineer, a company representative, a driller, a salesman, an agent, a broker, a consultant, a representative of a seller, or some other entity with an interest in a field operation. Communication between the user 250 and the computer system 202 can be facilitated using one or more communication protocols 237.

According to some example embodiments, the user 250 sends information (e.g., user preferences, settings, data) to the computer system 202 in a number of manners (e.g., modes of communication), including but not limited to the mail, a telephone, an email, a fax, a short message service, over the Internet, some other suitable mode for sending information, or any combination thereof. In certain example embodiments, the information sent by the user 250 to the computer system 202 is delivered automatically (e.g., according to a default setting, a consumer preference, an occurrence of an event) or on demand, for example, in response to a request from the computer system 202. The computer system 202 interacts with the user 250 in the same manner that the user 250 interacts with the computer system 202, or in a different manner using different modes of communication. The user 250 uses a user system (not shown), which is discussed below in further detail, to interact with the computer system 202 using software (not shown) in accordance with one or more example embodiments.

In one or more example embodiments, the measuring devices (e.g., drilling operation measuring devices 260, process measuring devices 262) are each an entity and/or system capable of receiving, sending, manipulating, and/or storing information associated with a field operation. Examples of the measuring devices can include, but are not limited to, a pressure sensor, a flow sensor, a proximity sensor, a thermometer, a switch, a relay, a gyroscope, a MWD tool, and the user 250. A number of measuring devices are used to receive, send, manipulate, and/or store information associated with a field operation according to some example embodiments. A drilling operation measuring device 260 is a device that measures one or more parameters associated with a drilling portion of a field operation. A process measuring device 262 is a device that measures one or more parameters associated with a process portion (which can include transient hydraulics) of a field operation.

In one or more example embodiments, each measuring device sends information (e.g., field data, operational data) to, and receives data (e.g., a request for data) from, the computer system 202. More specifically, each measuring device can send data to the data validation engine 208, which verifies that the measuring device is working properly and that the data sent by the measuring device is reliable. The data can be delivered automatically (e.g., according to a default setting, a marketing entity preference, an occurrence of an event) or on demand, as from a request made by the computer system 202. At least some of the measuring devices measure and send field data to the computer system 202 on a real-time basis.

Communication between the drilling operation measuring devices 260 and the computer system 202 can be facilitated using one or more communication protocols 234. Communication between the process measuring devices 262 and the computer system 202 can be facilitated using one or more communication protocols 235. Each measuring device can interact with the computer system 202 using the same mode of communication that the computer system 202 interacts with the measuring device or using different modes of communication in alternative example embodiments. In one or more example embodiments, each measuring device uses a measuring device system (not shown) to interact with the computer system 202 using measuring device software (not shown), which is discussed in further detail below.

In certain example embodiments, the drilling module 270 includes at least one off-the-shelf software package 272 and one or more models 271 (communicably coupled with the off-the-shelf software package 272) that are developed for the field system 100 to act as an interface with the computer system 202 and, in some cases, other off-the-shelf software packages and/or one or more models 271 within the drilling module 270. The one or more models 271 can be included in example embodiments and have one or more communication (e.g., data transfer) protocols 231 that are designed to communicate with the application interface 226 of the computer system 202. In other words, the one or more models 271 can be part of the example MPD THMS architecture.

As used herein, the term "off-the-shelf" can refer to a software package that is generally available from a third party and can be used for any of a number of field operations. Alternatively, the term "off-the-shelf" can refer to a software package that is specifically designed for a user 250 and/or for a particular field operation. In such a case, the software package can be created by the user 250 or a third party.

The drilling module 270 can include software that is designed to assess and evaluate, on a real-time basis, one or more components of the drilling operation, defined by the drilling activity within the wellbore 144 in the subterranean formation 110. Components of the drilling operation can include, but are not limited to, the tubing string 140, cuttings of the mud, and the annulus of the tubing string 140. The drilling module 270 uses drilling operation measuring devices 260 in performing its assessment and evaluation of the drilling operation. Examples of such drilling operation measuring devices 260 can include, but are not limited to, gyroscopes, flow meters, MWD tools, electromagnetic sources and receivers, and temperature sensors.

To the extent that data from portions of the field operation located above the sea floor 112 are needed, the drilling module 270 relies on estimates for such data. Actual values for such data are currently not attainable on a real-time basis because of the relatively recent developments in MPD, especially when using a MLP 158. Because conditions in the subterranean formation 110 can change drastically in a short amount of time, inaccurate and/or uncertain estimates of data, such as the data measured by the process measuring devices 262 and/or the drilling operation measuring devices 260, can prove costly in terms of safety and/or efficiency of a field operation.

In certain example embodiments, the dynamic process module 280 includes at least one off-the-shelf software package 282 and one or more models 281 (communicably coupled with the off-the-shelf software package 282) that are developed for the field system 100 to act as an interface with the computer system 202 and, in some cases, other off-the-shelf software packages, one or more models 291 within the transient hydraulic module 290, and/or one or more models 281 within the dynamic process module 280. The one or more models 281 can be included in example embodiments and have one or more communication (e.g., data transfer) protocols 232 that are designed to communicate with the application interface 226 of the computer system 202 and/or one or more communication protocols 238 that are designed to communicate with the transient hydraulic module 290 of the computer system 202. In other words, the one or more models 281 can be part of the example MPD THMS architecture.

The dynamic process module 280 can include software that is designed to assess and evaluate, on a real-time basis, one or more components of the process operation, defined by the circulation of sea water within the riser 118. Components of the process operation can include, but are not limited to, a manifold (e.g., a SMD manifold), seawater, and a MLP 158. The dynamic process module 280 uses process measuring devices 262 in performing its assessment and evaluation during the field operation. Examples of such process measuring devices 262 can include, but are not limited to, valve position indicators, gas analyzers, cuttings analyzers, flow meters, pressure sensors, and temperature sensors.

To the extent that data from portions of the field operation located below the sea floor 112 and/or in the recirculation of mud above the sea floor 112 are needed, the dynamic process module 280 relies on estimates for such data. Actual values for such data are currently not attainable on a real-time basis because of the relatively recent developments in MPD, especially when using a MLP 158. Again, because conditions in the subterranean formation 110 can change drastically in a short amount of time, inaccurate and/or uncertain estimates of data, such as the data measured by the drilling operation measuring devices 260 and/or the drilling operation measuring devices 260, can prove costly in terms of safety and/or efficiency of a field operation.

In certain example embodiments, the transient hydraulic module 290 includes at least one off-the-shelf software package 292 and one or more models 291 (communicably coupled with the off-the-shelf software package 292) that are developed for the field system 100 to act as an interface with the computer system 202 and, in some cases, other off-the-shelf software packages, one or more models 281 within the dynamic process module 280, and/or one or more models 291 within the transient hydraulic module 290. The one or more models 291 can be included in example embodiments and have one or more communication (e.g., data transfer) protocols 233 that are designed to communicate with the application interface 226 of the computer system 202 and/or one or more communication protocols 238 that are designed to communicate with the dynamic process module 290 of the computer system 202. In other words, the one or more models 291 can be part of the example MPD THMS architecture.

The transient hydraulic module 290 can include software that is designed to assess and evaluate, on a real-time basis, one or more components of the transient operation, defined by the return circulation of mud from beneath the sea floor 112 to the platform 175. Components of the transient operation can include, but are not limited to, the blow-out preventer 159, the return line, the subsea rotating device 156, and the solids processing unit 157. The transient hydraulic module 290 uses process measuring devices 262 in performing its assessment and evaluation during the field operation. In some cases, the transient hydraulic module 290 can be part of, or can be in direct communication with, the dynamic process module 280.

In certain example embodiments, a single model (e.g., model 271, model 281) can be used with more than one off-the-shelf software package (e.g., off-the-shelf software package 282, off-the-shelf software package 292), regardless of whether the off-the-shelf software packages are part of the same module (e.g., drilling module 270, dynamic process module 280, transient hydraulic module 290) or multiple modules. In addition, or in the alternative, a single off-the-shelf software package can be operatively coupled to more than one model. Each model (e.g., model 271, model 281) can be a discrete module or part of a single model. Each model can run on one or more hardware processors In some cases, even with the use of example embodiments, actual data may not be available. Instead, predictability tools (e.g., models) continue to be relied upon to provide certain data. However, by using the real-time data and real-time communication between various modules (e.g., dynamic process module 280) within the system 200, example embodiments can be used to provide more accurate calculations, estimates, or other data that is not read directly by a measuring device (e.g., process measuring devices 262).

To the extent that data from portions of the field operation located below the sea floor 112 and/or in the recirculation of sea water above the sea floor 112 are needed, the transient simulator module 290 relies on estimates for such data. Actual values for such data are currently not attainable on a real-time basis because of the relatively recent developments in MPD, especially when using a MLP 158. Once again, because conditions in the subterranean formation 110 can change drastically in a short amount of time, inaccurate and/or uncertain estimates of data, such as the data measured by the drilling operation measuring devices 260 and/or the process measuring devices 262, can prove costly in terms of safety and/or efficiency of a field operation.

The computer system 202 also can be implemented as a browser extension according to some example embodiments. In such a scenario, user software and/or measuring device software interacts directly with the computer system 202 as a browser extension.

Continuing with FIG. 2A, the computer system 202 interacts with the user 250, the drilling module 270, the dynamic process module 280, the transient hydraulic module 290, and/or each measuring device using an application interface 226 in accordance with one or more example embodiments. Specifically, the application interface 226 of the computer system 202 receives input from and sends output to the user 250, the drilling module 270, the dynamic process module 280, the transient hydraulic module 290, and/or each measuring device. The user 250, the drilling module 270, the dynamic process module 280, the transient hydraulic module 290, and/or each measuring device includes an interface to receive data from and send data to the computer system 202 in certain example embodiments. Examples of this interface include, but are not limited to, a graphical user interface, an application programming interface, a keyboard, a monitor, a mouse, a web service, a data protocol adapter, some other hardware and/or software, or any suitable combination thereof.

In one or more embodiments of the invention, the information received by the application interface 226 of the computer system 202 includes, but is not limited to, field data, operational data, user preferences, settings, and feedback. The information sent by the application interface 226 includes, but is not limited to, a request, a recommendation, a status report, and a notification. The information sent by the application interface 226 specifies, but is not limited to, a user, a field location, a data source, a Uniform Resource Identifier (URI) (e.g., a Uniform Resource Locator (URL), a web address, etc.), data identified by and/or requested by the dynamic integration engine 206, some other software or source of information, or any suitable combination thereof.

In one or more embodiments of the invention, the information (i.e., data) transferred among the application interface 226, the user 250, the drilling module 270, the dynamic process module 280, the transient hydraulic module 290, and/or each measuring device corresponds to metadata associated with such information. In this case, the metadata describes the data specified (i.e., the metadata provides context for the specified data). In one or more embodiments of the invention, the computer system 202 supports various data formats provided by the user 250, the drilling module 270, the dynamic process module 280, the transient hydraulic module 290, and/or each measuring device.

Continuing with FIG. 2A, the computer system 202 retrieves and stores data (e.g., field data, operational data, formulas, times, thresholds) in the storage repository 230. More specifically, the computer system 202 uses the dynamic integration engine 206 to retrieve and store data in the storage repository 230 in accordance with one or more example embodiments.

Continuing with FIG. 2A, the storage repository 230 is a persistent storage device (or set of devices) that stores software and data used to assist the dynamic integration engine 206 in integrating the example MPD THMS architecture. Examples of a storage repository 230 can include, but are not limited to, a database (or a number of databases), a file system, a hard drive, some other form of data storage, or any suitable combination thereof. The storage repository 230 can be located on multiple physical machines, each storing all or a portion of the data according to some example embodiments. Each storage unit or device of the storage repository 230 can be physically located in the same or different geographic location.

In certain example embodiments, the storage repository 230 is operatively connected to the dynamic integration application 204. In one or more example embodiments, the dynamic integration application 204 includes functionality to transfer data measured by one or more measuring devices to the drilling module 270, the dynamic process module 280, and/or the transient hydraulic module 290. More specifically, the dynamic integration application 204 can receive data from one or more measuring devices (using, at times, the storage repository 230), and can send such data to the drilling module 270, the dynamic process module 280, and/or the transient hydraulic module 290. The functions of the dynamic integration application 204 can be performed on a single computing device or on multiple computing devices. When the functions of the dynamic integration application 204 are performed on multiple computing devices, a number of configurations and/or frameworks are used in certain example embodiments. The configurations and/or software frameworks are designed to work with multiple data nodes and large quantities of data. One or more calculations performed by one or more components of the dynamic integration application 204 are performed on multiple machines operating in parallel, where the results from each machine is combined to generate a result to the one or more calculations.

In certain example embodiments, the data validation engine 208 receives data from one or more of the drilling operation measuring devices 260 and/or one or more of the process measuring devices 262 and validates this data to ensure that the data is reliable. The data validation engine 208 can validate data using one or more formulas and/or algorithms stored in the storage repository 230. If the data tested by the data validation engine 208 is valid, then the data validation engine 208 passes the data to the dynamic integration engine 206. If the data tested by the data validation engine 208 is not valid, then the data validation engine 208 notifies the dynamic integration engine 206 that there is a problem with the validity of the data. In turn, the dynamic integration engine 206 can notify the user 250, the drilling module 270, the dynamic process module 280, and/or the transient hydraulic module 290 that the data in question is invalid and/or that the particular device used to measure such data is not operating properly.

In certain example embodiments, the dynamic integration engine 206 merely sends and receives data between the user 250, the drilling module 270, the dynamic process module 280, the transient hydraulic module 290, and one or more measuring devices. Alternatively, the dynamic integration engine 206 can manipulate, calculate, model, or otherwise use data received from the user 250, the drilling module 270, the dynamic process module 280, the transient hydraulic module 290, and/or one or more measuring devices before sending data to the user, the drilling module 270, the dynamic process module 280, the transient hydraulic module 290, and/or one or more measuring devices. In any case, the data validation engine 208 may first validate the data before the dynamic integration engine 206 sends the data to another component of the system 200 and/or manipulates, calculates, models, or otherwise uses the data. If the dynamic integration engine 206 performs any manipulation or alteration of data, one or more formulas and/or algorithms stored in the storage repository 230 can be used by the dynamic integration engine 206 to perform such manipulations or alterations.

In one or more embodiments of the invention, the dynamic integration engine 206 of the dynamic integration application 204 coordinates the application interface 226, the storage repository 230, and, optionally, the security module 228. Specifically, the dynamic integration engine 206 coordinates the transfer of information between the application interface 226, the storage repository 230, and the other components of the dynamic integration application 204 according to certain example embodiments.

Further, the dynamic integration engine 206 also retrieves data from, and sends data to the storage repository 230 for use by the dynamic integration engine 206 or by other components of the dynamic integration application 204. The dynamic integration engine 206 also retrieves the data from the storage repository 230 to be sent to the user 250, the drilling module 270, the dynamic process module 280, the transient hydraulic module 290, and/or one or more measuring devices. Continuing with FIG. 2A, the dynamic integration engine 206 retrieves specific types of data from the data repository 230 and/or one or more specific measuring devices. Alternatively, the dynamic integration engine 206 queries all measuring devices and the storage repository 230 for any information needed.

In certain example embodiments, the dynamic integration engine 206 receives data from the one or more measuring devices. The dynamic integration engine 206 also sends a request for data to the one or more measuring devices in certain example embodiments. A request is for a specific type of data in some example embodiments. A request also is sent to a specific measuring device according to some example embodiments. A request is sent based on one or more of a number of events, including but not limited to passage of time, a request from a user, and a request from the drilling module 270, the dynamic process module 280, and/or the transient hydraulic module 290. Any request sent and/or data received by the dynamic integration engine 206 is executed using the application interface 226.

Continuing with FIG. 2A, the hardware processor 220 within the computer system 202 executes software in accordance with one or more embodiments of the invention. Specifically, the hardware processor 220 executes the computer system 202 or any components thereof described above and shown in FIG. 2A, as well as software used by the user 250, the. The hardware processor 220 can be an integrated circuit, a central processing unit, a multi-core processing chip, a multi-chip module including multiple multi-core processing chips, or other hardware processor in one or more example embodiments. The hardware processor 220 can be known by other names, including but not limited to a computer processor, a microprocessor, and a multi-core processor. In one or more embodiments of the invention, the hardware processor 220 executes software instructions stored in memory 222. The memory 222 includes one or more cache memories, main memory, and/or any other suitable type of memory. The memory 222 is discretely located on the computer system 202 relative to the hardware processor 220 according to some example embodiments. In certain configurations, the memory 222 is integrated with the hardware processor 220.

Optionally, in one or more example embodiments, the security module 228 secures interactions between the computer system 202 and the user 250, the drilling module 270, the dynamic process module 280, the transient hydraulic module 290, and/or one or more measuring devices. More specifically, the security module 228 authenticates communication from software based on security keys verifying the identity of the source of the communication. For example, user software may be associated with a security key enabling the user software to interact with the computer system 202. Further, the security module 228 restricts receipt of information, requests for information, and/or access to information in some example embodiments.

Any software (e.g., user software, drilling module software) external to the computer system 202 can interact with the computer system 202 using a browser extension. In this case, the browser extension maintains an active session with the computer system 202 after the security module 228 has authenticated the external software. For example, the browser extension continues to interact with the computer system 202 as the user 250 views various web content in the user software. In this example, the browser extension receives notifications from the computer system 202 for presenting to the user 250.

As discussed above, the user 250, the drilling module 270 (including various models 271 thereof), the dynamic process module 280 (including various models 281 thereof), the transient hydraulic module 290 (including various models 291 thereof), and/or one or more measuring devices can use and/or include a system in certain example embodiments. One or more of such systems are, or contain a form of, an Internet-based or an intranet-based computer system that is capable of communicating with the software of the application interface 226 using one or more of a number of communication (e.g., data transfer) protocols. Such a computer system can include any type of computing device and/or communication device, including but not limited to computer system 202. Examples of such a system includes, but are not limited to, a desktop computer with Internet or intranet access, a laptop computer with Internet or intranet access, a smart phone, a server, a server farm, and a personal digital assistant (PDA). Any such system can correspond to a computer system as described below with regard to FIG. 4.

Further, as discussed above, any such system of the user 250, the drilling module 270, the dynamic process module 280, the transient hydraulic module 290, and/or one or more measuring devices can have corresponding software (e.g., user software, drilling module software). Such software can execute on a separate device (e.g., a server, mainframe, desktop personal computer (PC), laptop, personal desktop assistant (PDA), television, cable box, satellite box, kiosk, telephone, mobile phone, or other computing devices) from the computer system 202, the user 250, the drilling module 270, the dynamic process module 280, the transient hydraulic module 290, and/or one or more measuring devices can, and can be coupled by a network (e.g., Internet, Intranet, Extranet, Local Area Network (LAN), Wide Area Network (WAN), or other network communication methods), with wired and/or wireless segments according to some example embodiments.

In one or more example embodiments, any such software can display web page(s) (i.e., web content). More specifically, such software can be any software capable of rendering Hypertext Markup Language (HTML) in one or more example embodiments. For example, such software can be a web browser(s) used by the corresponding system to access web pages (i.e., web content) over the Internet (or other Wide Area Network or Local Area Network). Such software can also display data in other formats, including but not limited to JavaScript®, JavaScript® Object Notation (JSON) and XML. (JavaScript is a registered trademark and service mark of Oracle America, Inc. of Redwood Shores, Calif.)

In one or more example embodiments, such software can provide support for browser extension(s). More specifically, such software can provide an open framework (i.e., software design that allows for easy removal, addition, and/or replacement of software components) for adding features to the software. In this case, a browser extension is an application that extends the functionality of the software using the open framework. The software can interact with the computer system 202, the user 250, the drilling module 270, the dynamic process module 280, the transient hydraulic module 290, and/or one or more measuring devices using the browser extension(s). Further, the browser extension(s) interacts with an interface (e.g., graphical user interface) of the software.

Figure 2B:
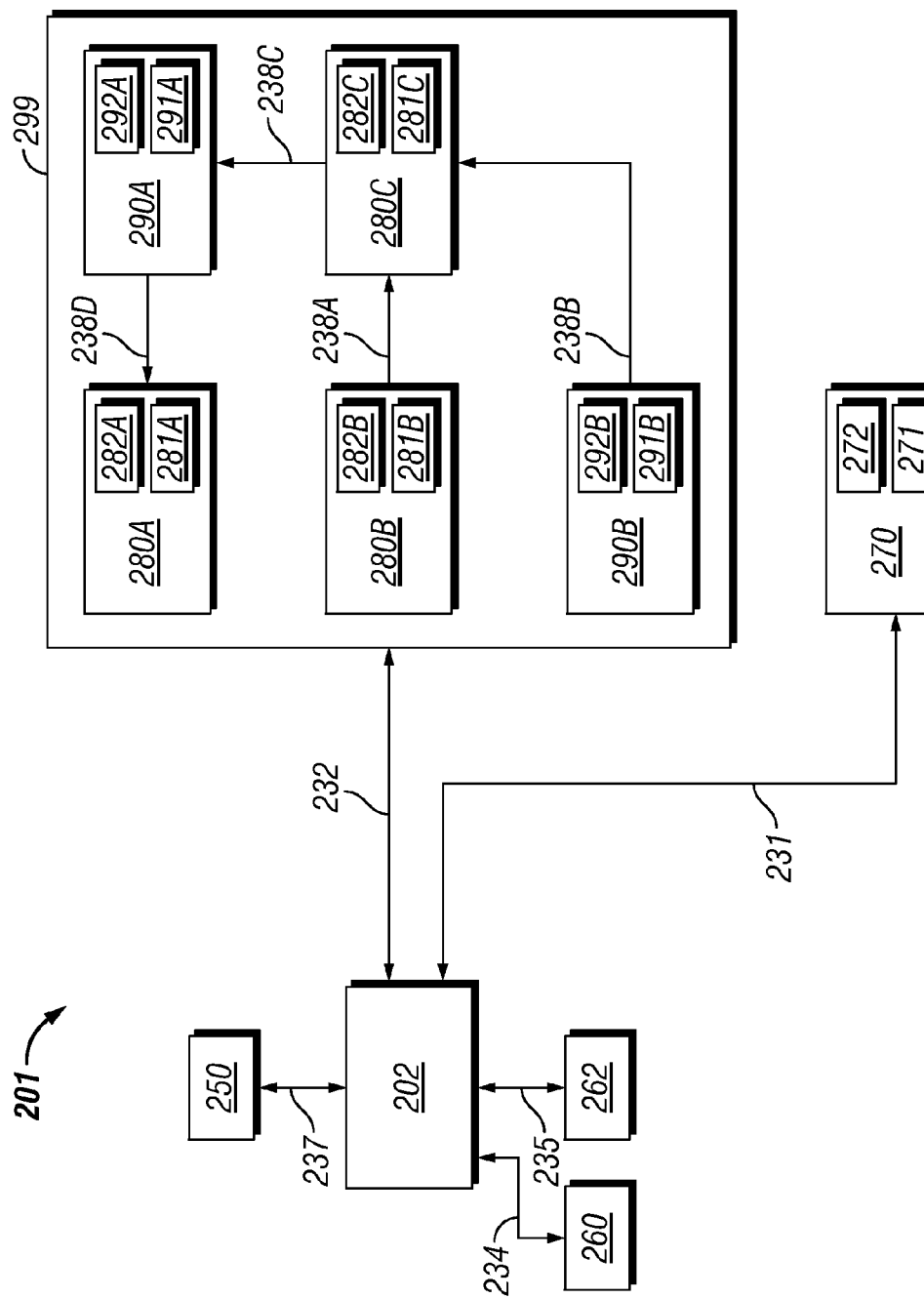
FIG. 2B shows a diagram of an example of a MPD THMS architecture in accordance with certain example embodiments.

FIG. 2B shows another example of a MPD THMS architecture 201 in accordance with certain example embodiments. Referring to FIGS. 1-2B, the MPD THMS architecture 201 of FIG. 2B includes the computer system 202, the drilling operation measuring devices 260, the process measuring devices 262, the drilling module 270, and the user 250 as in FIG. 2A. Specifically, the computer system 202 can have bi-directional communication with each of the drilling operation measuring devices 260 (using communication protocol 234), the process measuring devices 262 (using communication protocol 235), the drilling module 270 (using communication protocol 231), and the user 250 (using communication protocol 237).

In this case, the dynamic process module 280 and the transient hydraulic module 290 of FIG. 2A are combined into a single example subsystem 299 that has bi-directional communication, using communication protocol 232, with the computer system 202. The example subsystem 299 can be a combination of one or more dynamic process modules 280 and/or one or more transient hydraulic modules 290. When there is at least one dynamic process module 280 and at least one transient hydraulic module 290 in the example subsystem 299, then the respective models of each of those modules can be configured to allow a module to communicate with one or more other modules (using one or more communication protocols 238) in the subsystem 299 and/or with the computer system 202 (using communication protocol 232).

In this case, the subsystem 299 includes three dynamic process modules (dynamic process module 280A, dynamic process module 280B, and dynamic process module 280C) and two transient hydraulic modules (transient hydraulic module 290A and transient hydraulic module 290B). Dynamic process module 280A, which in this example is for a SMD manifold, includes an off-the-shelf software package 282A communicably coupled with a model 281A. Dynamic process module 280B, which in this example is for the seawater, includes an off-the-shelf software package 282B communicably coupled with a model 281B. Dynamic process module 280C, which in this example is for the MLP 158, includes an off-the-shelf software package 282C communicably coupled with a model 281C. Transient hydraulic module 290A, which in this example is for the return line, includes an off-the-shelf software package 292A communicably coupled with a model 291A. Transient hydraulic module 290B, which in this example is for the blow-out preventer 159, the solids processing unit 157, and the subsea rotating device 156, includes an off-the-shelf software package 292B communicably coupled with a model 291B.

In this example, the model 281B of the dynamic process module 281B is configured to interface between the off-the-shelf software package 282B of the dynamic process module 280B and the model 281C of the dynamic process module 280C using communication protocol 238A. Similarly, the model 291B of the transient hydraulic module 290B is configured to interface between the off-the-shelf software package 292B of the transient hydraulic module 290B and the model 281C of the dynamic process module 280C using communication protocol 238B.

Continuing with FIG. 2B, the model 281C of the dynamic process module 281C is configured to interface between the off-the-shelf software package 282C of the dynamic process module 280C and the model 291A of the transient hydraulic module 290A using communication protocol 238C. The model 291A of the transient hydraulic module 290A is configured to interface between the off-the-shelf software package 292A of the transient hydraulic module 290A and the model 281A of the dynamic process module 280A using communication protocol 238D. In addition, any or all of the models (in this case, model 281A, model 281B, model 281C, model 291A, and/or model 291B) of the subsystem 299 can be configured to communicate with the computer system 202 using communication protocol 232.

As described above, the various off-the-shelf software packages communicate with the computer system 202 using the application interface 226 and one or more communication protocols. Example embodiments allow for real-time communication between the computer system 202 and the various components of the system (e.g., system 200, system 201). The computer system 202 communicates (e.g., sends and receives data) with the various models associated with the various off-the-shelf software packages so that real world results can be accurately and timely simulated and/or modeled. For instance, example embodiments can assist with pressure control during a field operation by providing information about pressure in various portions of a field operation as an advisory backup to primary annular pressure-while-drilling measurements. As another example, certain embodiments described herein can be used for well planning purposes.

Of particular importance in field operations is the ability of example embodiments to integrate pressure, flow, temperature, and other critical parameters between the various off-the-shelf software packages (or even the modules to which the off-the-shelf software packages belong). When a MLP 158 is used in a deep water field operation, integration of pressures and flow rates becomes even more critical, and example embodiments integrate the various modules with off-the-shelf software packages seamlessly and in real time. Thus, example embodiments can process and transfer data such as temperature, pressure, and flow properties of actual and/or simulated flows from a module that includes an off-the-shelf software package producing said information to a module that includes an off-the-shelf software package consuming said information, including the transfer of data that includes hydrodynamic and energy relationships, so that the receiving module can estimate the evolution of temperature, pressure and flow in a coordinated fashion.

The architecture taught by example embodiments also provides a means for testing of the control configuration and for validating operating procedures. In addition, the flexibility of the application interface 226 and its ability to use a number of communication protocols enables a plug-and-play capability for the integrated system 200. As a result, different off-the-shelf software packages, whether for the same or a different process within a field operation, can be used with example embodiments.

Figure 3:
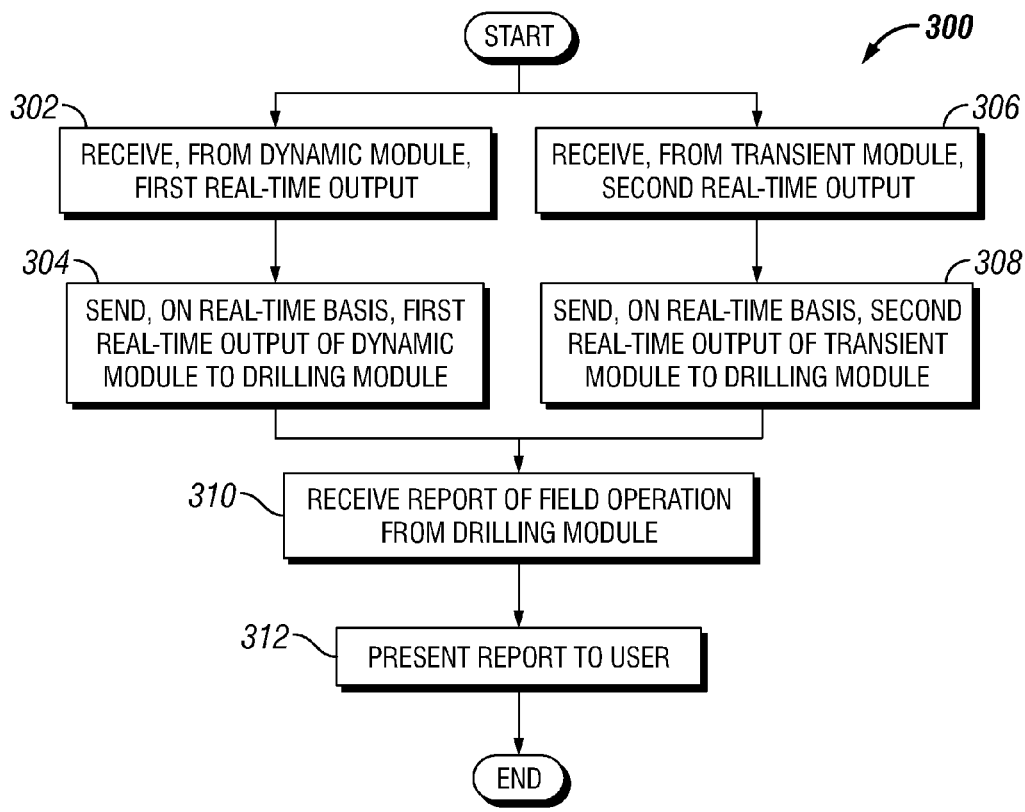
FIG. 3 shows a flowchart of a method in accordance with one or more example embodiments.

FIG. 3 is a flowchart of a method 300 for integrating real-time data associated with an off shore field operation in accordance with one or more example embodiments. While the various steps in this flowchart are presented and described sequentially, one of ordinary skill in the art will appreciate that some or all of the steps are executed in different orders, combined or omitted, and some or all of the steps are executed in parallel depending upon the example embodiment. Further, in one or more of the example embodiments, one or more of the steps described below are omitted, repeated, and/or performed in a different order. In addition, a person of ordinary skill in the art will appreciate that additional steps not shown in FIG. 3, is included in performing this method in certain example embodiments. Accordingly, the specific arrangement of steps should not be construed as limiting the scope. In addition, a particular computing device, as described, for example, in FIG. 4 below, is used to perform one or more of the steps for the method 300 described below in certain example embodiments.

Now referring to FIGS. 1-3, the example method 300 begins at START step and proceeds to step 302, where a first real-time output is received. The first real-time output can be received from a dynamic process module 280. In certain example embodiments, the first real-time output is based on real-time process data measured by one or more process measuring devices 262. The real-time process data can be measured during a dual gradient drilling operation, where the off shore field operation includes the dual gradient drilling operation. In addition, or in the alternative, the real-time process data can be received from the process measuring devices 262 without first being processed by the dynamic process module 280. If the dual gradient drilling operation uses a MLP 158, then the real-time process data can be associated with the MLP 158.

In step 304, the first real-time output of the dynamic process module 280 is sent to a drilling module 270. The first real-time output can be sent on a real-time basis. In certain example embodiments, the first real-time output is sent during the dual gradient drilling operation. The drilling module 270 can generate a report of the dual gradient drilling operation using the first real-time output of the dynamic process module 280. If the real-time process data can be received from the process measuring devices 262, then the real-time process data can be sent to the drilling module 270 on a real-time basis. In such a case, the real-time process data can first be manipulated before being sent to the drilling module 270. Alternatively, the real-time process data can be unaltered when sent to the drilling module 270.

In step 306, a second real-time output can be received. The second real-time output can be received from a transient hydraulic module 290. In certain example embodiments, the second real-time output is based on real-time transient hydraulic data measured by one or more dynamic measuring devices 262. The real-time process data can be measured during the dual gradient drilling operation. In addition, or in the alternative, the real-time transient hydraulic data can be received from the dynamic measuring devices 262 without first being processed by the transient hydraulic module 290. If the dual gradient drilling operation uses a MLP 158, then the real-time transient hydraulic data can be associated with the MLP 158. For example, the real-time transient hydraulic data can be associated with drilling mud pumped from a MLP 158 using at least one separate mud return line (e.g., mud return line 117, mud return line 119). In step 308, the second real-time output of the transient hydraulic module 290 can be sent to the drilling module 270. The second real-time output can be sent on a real-time basis. In certain example embodiments, the second real-time output is sent during the dual gradient drilling operation. If the real-time transient hydraulic data can be received from the dynamic measuring devices 262, then the real-time transient hydraulic data can be sent to the drilling module 270 on a real-time basis. In such a case, the real-time transient hydraulic data can first be manipulated before being sent to the drilling module 270. Alternatively, the real-time transient hydraulic data can be unaltered when sent to the drilling module 270.

The drilling module 270 further can generate the report of the dual gradient drilling operation using the second real-time output of the transient hydraulic module 290. Step 306 and step 308 can be performed at substantially the same time as steps 302 and 304. In some cases, as when the transient hydraulic module 290 is combined with the dynamic process module 280, steps 306 and 308 can be combined with steps 302 and 304, respectively. In step 310, a report of the field operation can be received from the drilling module 270. Alternatively, a report is generated based on output received from the drilling module 270. In step 312, the report is presented to a user. In some cases (for example, at the end of a field operation), after step 312 is completed, the method 300 ends at the END step. Alternatively, in certain example embodiments (for example, during a field operation), after step 312 (or any other step of the method 300) is completed, the method 300 can proceed to one or more other steps (e.g., step 302, step 306).

Figure 4:
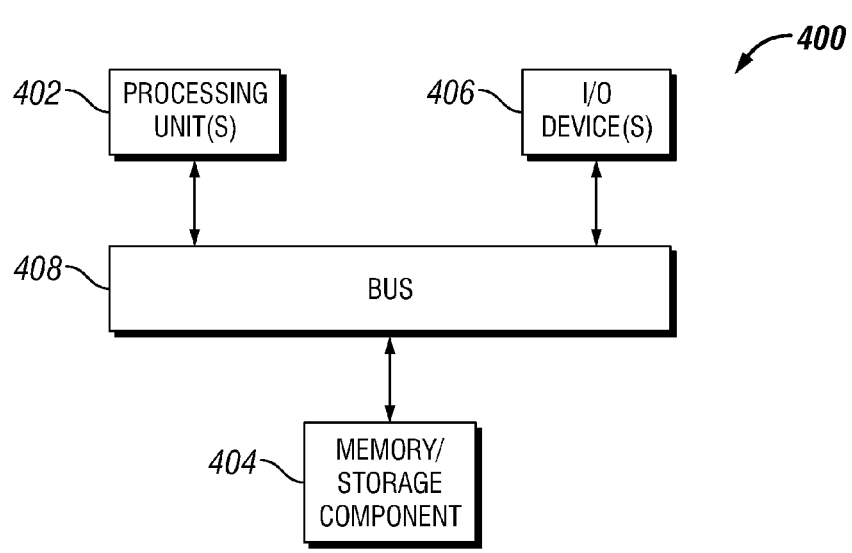
FIG. 4 shows a computing device in accordance with one or more example embodiments.

FIG. 4 illustrates one embodiment of a computing device 400 that implements one or more of the various techniques described herein, and which is representative, in whole or in part, of the elements described herein pursuant to certain example embodiments. Computing device 400 is one example of a computing device and is not intended to suggest any limitation as to scope of use or functionality of the computing device and/or its possible architectures. Neither should computing device 400 be interpreted as having any dependency or requirement relating to any one or combination of components illustrated in the example computing device 400.

Computing device 400 includes one or more processors or processing units 402, one or more memory/storage components 404, one or more input/output (I/O) devices 406, and a bus 408 that allows the various components and devices to communicate with one another. Bus 408 represents one or more of any of several types of bus structures, including a memory bus or memory controller, a peripheral bus, an accelerated graphics port, and a processor or local bus using any of a variety of bus architectures. Bus 408 includes wired and/or wireless buses.

Memory/storage component 404 represents one or more computer storage media. Memory/storage component 404 includes volatile media (such as random access memory (RAM)) and/or nonvolatile media (such as read only memory (ROM), flash memory, optical disks, magnetic disks, and so forth). Memory/storage component 404 includes fixed media (e.g., RAM, ROM, a fixed hard drive, etc.) as well as removable media (e.g., a Flash memory drive, a removable hard drive, an optical disk, and so forth).

One or more I/O devices 406 allow a customer, utility, or other user to enter commands and information to computing device 400, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 400 is connected to a network (not shown) (e.g., a local area network (LAN), a wide area network (WAN) such as the Internet, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 400 includes at least the minimal processing, input, and/or output means necessary to practice one or more embodiments.

Further, those skilled in the art will appreciate that one or more elements of the aforementioned computer device 400 is located at a remote location and connected to the other elements over a network in certain example embodiments. Further, one or more embodiments is implemented on a distributed system having one or more nodes, where each portion of the implementation (e.g., dynamic integration engine 206) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

One or more example embodiments provide for integrating field data, measured by multiple measuring devices throughout the field, into one or more modules that target a specific aspect of the field operation. Example embodiments are useful for MPD operations, and in particular when a MLP is used in the MPD operations. By providing real-time, actual, measured data from the field to the various modules, those modules can rely on the actual data rather than estimated values. Because of the complexity of MPD operations, especially when using a MLP, and because of the radical changes in a subterranean formation that can occur during a field operation such as a drilling operation, having actual data can be critical to improve safety and efficiency. Thus, example embodiments allow for the use of actual data, greatly improving safety and efficiency of the field operation. For instance, example embodiments can be used in field operations (e.g., in-progress drilling, simulation, modeling, training, planning) that include a MLP, so that one or more details of the operation, including characteristics and/or settings of the MLP, can be optimized, predicted, simulated, and/or otherwise modeled.

As a consequence of the improved safety and efficiency of a field operation using example embodiments, the benefits of MPD can be more greatly realized. For example, field operations using example embodiments can take place in even deeper waters. As another example, field operations using example embodiments allow a wellbore to go deeper into a subterranean formation. As yet another example, field operations using example embodiments use fewer bit runs and less material, thereby reducing costs. For instance, when a wellbore is being drilled using example embodiments, the increased real-time operational confidence in the subterranean formation and other operational characteristics translates to longer, more successful bit runs. When the wellbore is completed, less casing pipe is required because of the reduced number of bit runs.

Example embodiments can be used in one or more of a number of situations with respect to a field operation. Examples of such situations can include, but are not limited to, real-time operations using actual measured data, real-time operations using modeled data, predictive modeling (forecasting), simulations (as for training purposes), offline for a field operation. Example embodiments can be used with any of a number of MPD operations, including but not limited to SMD and DGD.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A system for performing off shore field operations, the system comprising:
    a plurality of process measuring devices that measure a plurality of real-time process data, wherein the plurality of process measuring devices is selected from the group consisting of valve position indicators, gas analyzers, cuttings analyzers, flow meters, pressure sensors, temperature sensors and combinations thereof and the plurality of real-time process data are associated with a manifold, seawater, a mud lift pump, a blowout preventer, a return line, a subsea rotating device and/or a solids processing unit;
    a plurality of drilling operation measuring devices that measure a plurality of real-time drilling operation data distinct from the plurality of real-time process data, wherein the plurality of drilling operation measuring devices is selected from the group consisting of gyroscopes, flow meters, measuring while drilling tools, electromagnetic sources and receivers, temperature sensors and combinations thereof and the plurality of real-time drilling operation data are associated with tubing string and/or drilling mud;
    a wellhead stack positioned at a sea floor, wherein the wellhead stack performs managed pressure drilling (MPD) as part of the field operations;
    a dynamic process module executing on a first hardware processor and providing first real-time output during the MPD using the plurality of real-time process data, wherein the dynamic process module comprises a first off-the-shelf software package communicably coupled to a first model configured to simulate activities involving circulation of sea water within a riser above the sea floor on a real-time basis;
    a dynamic integration engine executing on a second hardware processor and receiving a first real-time output from the first model of the dynamic process module; and
    a drilling module executing on a third hardware processor and providing real-time drilling data during the MPD, wherein the drilling module comprises a second off-the-shelf software package communicably coupled to a second model configured to simulate activities under the sea floor on a real-time basis,
    wherein the real-time drilling data is based on the plurality of real-time drilling operation data and the first real-time output of the dynamic process module received from the dynamic integration engine.

2. The system of claim 1, wherein the dynamic integration engine further validates the real-time process data and subsequently sends the plurality of real-time process data to the dynamic process module.

3. The system of claim 1, wherein the wellhead stack comprises the mud lift pump, and wherein the mud lift pump is used for the MPD.

4. The system of claim 3, wherein the mud lift pump returns drilling mud, using the mud return line, from the sea floor to a mud processing unit.

5. The system of claim 3, wherein the plurality of process measuring devices further measure a plurality of real-time transient hydraulic data.

6. The system of claim 5, further comprising:
    a transient hydraulic module executing on a fourth hardware processor and providing real-time transient hydraulic data during the MPD using the plurality of real-time transient hydraulic data, wherein the transient hydraulic module comprises a third off-the-shelf software package communicably coupled to a third model configured to simulate activities involving return circulation of drilling mud from beneath the sea floor to a platform on a real-time basis, wherein the dynamic integration engine further receives a second real-time output from the third model of the transient hydraulic module, and wherein the real-time drilling data provided by the drilling module is further based on the second real-time output from the third model of the transient hydraulic module received from the dynamic integration engine.

7. The system of claim 6, wherein the transient hydraulic module is part of the dynamic process module.

8. The system of claim 7, wherein the real-time process data is associated with the mud lift pump.

9. The system of claim 1, wherein the sea floor is at least 500 feet below the water level.

10. The system of claim 1, wherein the dynamic process module further comprises a second dynamic process module off-the-shelf software package communicably coupled to a second dynamic process module model, wherein the dynamic integration engine further receives a second real-time output from the second dynamic process module model of the dynamic process module.

11. A method for integrating real-time process data, real-time drilling operation data, real-time process simulation output, and real-time drilling operation simulation output associated with an off shore sea floor mud lift drilling operation in which a wellhead stack positioned at a sea floor performs managed pressure drilling (MPD), the method comprising:

in a dynamic integration engine executing on a processor, receiving, from a dynamic process module, a first real-time output based on a plurality of real-time process data measured by a plurality of process measuring devices during the sea floor mud lift drilling operation; and sending, on a real-time basis, the first real-time output of the dynamic process module from the dynamic integration engine to a drilling module during the sea floor mud lift drilling operation, wherein the drilling module generates a report of the sea floor mud lift drilling operation using the first real-time output of the dynamic process module and real-time drilling operation data measured by a plurality of drilling operation measuring devices during the sea floor mud lift drilling operation.

12. The method of claim 11, further comprising:
manipulating the first real-time output of the dynamic process module before sending the first real-time output to the drilling module.

13. The method of claim 11, further comprising:
in an application interface executing on the processor and coordinated by the dynamic integration engine, receiving, on the real-time basis, the plurality of real-time process data from the plurality of process measuring devices; and sending, on the real-time basis, the plurality of real-time process data from the application interface to the drilling module.

14. The method of claim 11, wherein the sea floor mud lift drilling operation uses a mud lift pump, and wherein the real-time process data is associated with the mud lift pump.

15. The method of claim 14, further comprising:
in the dynamic integration engine executing on the processor, receiving, from a transient hydraulic module, a second real-time output, wherein the second real-time output is based on a plurality of real-time transient hydraulic data measured by the plurality of process measuring devices; and sending, on a real-time basis, the second real-time output of the transient hydraulic module from the dynamic integration engine to the drilling module during the sea floor mud lift drilling operation, wherein the report generated by the drilling module further uses the second real-time output of the transient hydraulic module.

16. The method of claim 15, further comprising:
manipulating the second real-time output of the transient hydraulic module before sending the second real-time output to the drilling module.

17. The method of claim 15, further comprising:
in an application interface executing on the processor and coordinated by the dynamic integration engine, receiving, on the real-time basis, the plurality of real-time transient hydraulic data from the plurality of process measuring devices; and sending, on the real-time basis, the plurality of real-time transient hydraulic data from the application interface to the drilling module.

18. The method of claim 15, wherein the plurality of real-time transient hydraulic data is associated with drilling mud pumped from the mud lift pump using at least one separate mud return line.

19. The method of claim 11, further comprising:
receiving the report of the sea floor mud lift drilling operation from the drilling module; and
presenting the report to a user.

20. The method of claim 11, further comprising:
utilizing the report to provide calculations, estimates and/or predictions of real-time conditions associated with the sea floor mud lift drilling operation when actual real-time data is not available.

* * * * *